US008823311B2

(12) United States Patent
Barth (10) Patent No.: US 8,823,311 B2
(45) Date of Patent: Sep. 2, 2014

(54) SYSTEM AND METHOD FOR CONTROLLING A STEP MOTOR

(75) Inventor: Martin Barth, Munich (DE)

(73) Assignee: Infineon Technologies AG, Neubiberg (DE)

( * ) Notice: Subject to any disclaimer, the term of this patent is extended or adjusted under 35 U.S.C. 154(b) by 256 days.

(21) Appl. No.: 13/249,446

(22) Filed: Sep. 30, 2011

(65) Prior Publication Data

US 2013/0082635 A1    Apr. 4, 2013

(51) Int. Cl.
*H02P 8/00*    (2006.01)
*B60Q 1/076*    (2006.01)

(52) U.S. Cl.
USPC ...... 318/696; 318/685; 318/400.42; 362/464; 362/465; 362/466; 315/80; 315/82; 315/77; 701/36; 701/49

(58) Field of Classification Search
CPC ..... B60Q 1/076; B60Q 2300/146; H02P 8/38
USPC ................. 318/696, 685, 806, 807, 798, 799, 318/400.13, 400.42; 362/464, 465, 644; 315/80, 82, 77; 701/36, 49
See application file for complete search history.

(56) References Cited

U.S. PATENT DOCUMENTS

| 3,586,953 | A | * | 6/1971 | Markkanen et al. | ............ | 318/68 |
| 4,172,990 | A | * | 10/1979 | Everett et al. | ................. | 318/685 |
| 4,187,455 | A | * | 2/1980 | Martin | ........................... | 318/594 |
| 4,353,019 | A | * | 10/1982 | Sweeney, Jr. | ................. | 318/594 |
| 4,362,980 | A | * | 12/1982 | Itzkowitz | ....................... | 318/685 |
| 4,392,097 | A | * | 7/1983 | Landrock et al. | ............ | 318/696 |
| 4,583,152 | A | * | 4/1986 | Kawai et al. | .................. | 362/466 |
| 4,968,896 | A | * | 11/1990 | Shibata et al. | ............... | 307/10.8 |
| 5,459,631 | A | * | 10/1995 | Leone et al. | .................. | 361/154 |
| 5,929,589 | A |  | 7/1999 | Suzuki et al. | | |
| 5,982,124 | A | * | 11/1999 | Wang | ........................... | 318/466 |
| 6,430,521 | B1 | * | 8/2002 | Toda | ............................ | 702/150 |
| 6,504,265 | B2 | * | 1/2003 | Toda et al. | .................... | 307/10.8 |
| 6,781,341 | B2 | * | 8/2004 | Nakamichi et al. | ........... | 318/685 |
| 7,106,668 | B2 | * | 9/2006 | Okada et al. | ............... | 369/30.27 |
| 7,239,097 | B2 | * | 7/2007 | Hashimoto | ............. | 318/400.08 |
| 7,241,034 | B2 | * | 7/2007 | Smith et al. | .................... | 362/465 |
| 7,568,822 | B2 | * | 8/2009 | Ibrahim | ........................ | 362/466 |
| 8,134,295 | B2 | * | 3/2012 | Sasa et al. | ....................... | 315/80 |
| 2007/0114956 | A1 | * | 5/2007 | Hashimoto | .................. | 318/139 |
| 2011/0121733 | A1 |  | 5/2011 | Choi et al. | | |

FOREIGN PATENT DOCUMENTS

| DE | 29 45 458 | 11/1979 |
| DE | 195 32 502 | 3/1996 |
| DE | 196 02 371 | 7/1997 |
| DE | 198 11 007 | 9/1998 |
| DE | 19938624 A1 | 3/2001 |
| DE | 69937387 T2 | 8/2008 |

\* cited by examiner

*Primary Examiner* — Rita Leykin
(74) *Attorney, Agent, or Firm* — Slater & Matsil, L.L.P.

(57) ABSTRACT

In an embodiment, a method of controlling a step motor system includes operating the step motor system in a normal mode. In the normal mode, the step motor is advanced upon receipt of a step pulse. If a failure event is detected, the step motor is operated in a failure mode. In the failure mode, a failure counter is incremented upon receipt of the step pulse, and the step motor is not advanced.

29 Claims, 4 Drawing Sheets

SYSTEM AND METHOD FOR CONTROLLING A STEP MOTOR

TECHNICAL FIELD

This invention relates generally to semiconductor circuits and methods, and more particularly to a system and method for controlling a step motor.

BACKGROUND

Adaptive Front Lighting Systems (AFS) are commonly used to control the intensity and direction of automotive headlamps. An AFS may be used to adjust the angular position of a headlamp to compensate for position changes that occur during acceleration and deceleration of the vehicle. For example, when a car accelerates, the front end of the car may be prone to increasing its angle upward from the road. This increase in angle shifts the beam of the headlamp upward from the road and into oncoming traffic, thereby posing a hazard to other drivers. Furthermore, the horizontal angle of the headlamps may be further affected as the automobile makes a turn. In an AFS system, a motor may be used to control the angular direction of the headlamps, such that the angle of the headlamp is reduced with respect to the road in order to compensate for the increase in angle due to acceleration or due to turning. In many AFS applications, one or more step motors are used to control the position of a headlamp chassis. Some countries, in fact, have mandated the use of such systems for automobiles having high intensity discharge (HID) lamps.

In the event of a failure condition, such as a momentary loss of power, or a shutdown in the motor driver circuit, the position of the headlamp may become fixed in an unsafe position that may pose a danger to other drivers such as dazing or blinding. In some systems, the position of the step motors that position the headlamps are reset and reinitialized after the car is shut down and the key is turned in the ignition.

SUMMARY OF THE INVENTION

In an embodiment, a method of controlling a step motor system includes operating the step motor system in a normal mode. In the normal mode, the step motor is advanced upon receipt of a step pulse. If a failure event is detected, the step motor is operated in a failure mode. In the failure mode, a failure counter is incremented upon receipt of the step pulse, and the step motor is not advanced.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a step motor driver for an automotive headlamp system. The invention may also be applied, however, to other types of circuits and systems, such as motor controllers, and safety systems.

Bipolar step motors are often used for moving a headlamp chassis in automotive AFS systems. Since bipolar step motors typically do not have position feedback, they are generally controlled in an open loop fashion. For example, the position of the headlamp chassis may be determined by keeping track of the number of step commands that have been issued to the step motor. In an embodiment, these step commands may be a positive step command, in which the step motor is advanced in one direction, or a negative step command, in which the step motor is advanced in the opposite direction. If, however, the motor driver circuit shuts down during operation such that the system loses track of the step motor position, there is a risk that the headlamp chassis may be stuck in a position, or have the potential to be moved to a position where they daze or blind vehicle occupants in oncoming traffic.

In an embodiment headlamp motor control system, failures of headlamp systems are detected an analyzed. If the failure is a recoverable failure, for example, a power supply disturbance that temporarily interrupts the power supply of the motor controller, a number of motor step commands received by the motor are tracked. By knowing the exact position when the shutdown has been occurred as well as a root cause of the failure, a control unit may decide whether a possible restart without initialization might be feasible to avoid a period in which headlamps are shining into oncoming traffic. In some embodiments, once the failure condition goes away, the contents of the failure counter are subtracted from the contents of a step counter so that the value of the step counter more accurately describes the step motor position. If, on the other hand, the failure is non-recoverable, for example due to a shorted or open coil in the motor control system, the system is shut down and/or disabled. In some embodiments, the system may be restarted after an initialization in the case of a non-recoverable failure.

Figure 1A:
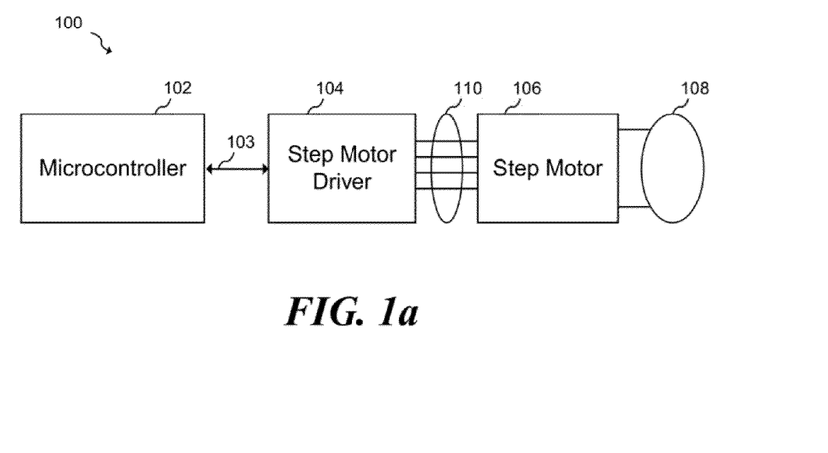
FIGS. 1a and 1b illustrate a headlamp system according to an embodiment of the present invention.

FIG. 1a illustrates automotive headlamp system 100 according to an embodiment of the present invention. In an embodiment, headlamp chassis 108 is mechanically coupled to step motor 106. Step motor 106 may be a bipolar step motor, or another type of step motor, such as a brushless DC motor. While only a single step motor is illustrated in FIG. 1a, is should be appreciated that more than one step motor may be coupled to a headlamp or to a headlamp chassis in order to provide more than one controllable axis of motion. For example, multiple motors may be used to control the motion of the headlamp side to side, as well as up and down. Step motor driver 104 controls the position of step motor 106 via electrical interface 110. Step commands are issued by microcontroller 102 via interface 103. In some embodiments, microcontroller 102 can also read and write command and status information from and to step motor driver 104. In some embodiments, microcontroller 102 may be a stand-alone controller dedicated to headlamps system 100. In other embodiments, microcontroller 102 may be dedicated to multiple headlamps or to other automotive system functions. In further embodiments, the function of microcontroller 102 may be implemented in other ways, for example by using a microprocessor, computer, dedicated logic, or other systems.

Figure 1B:
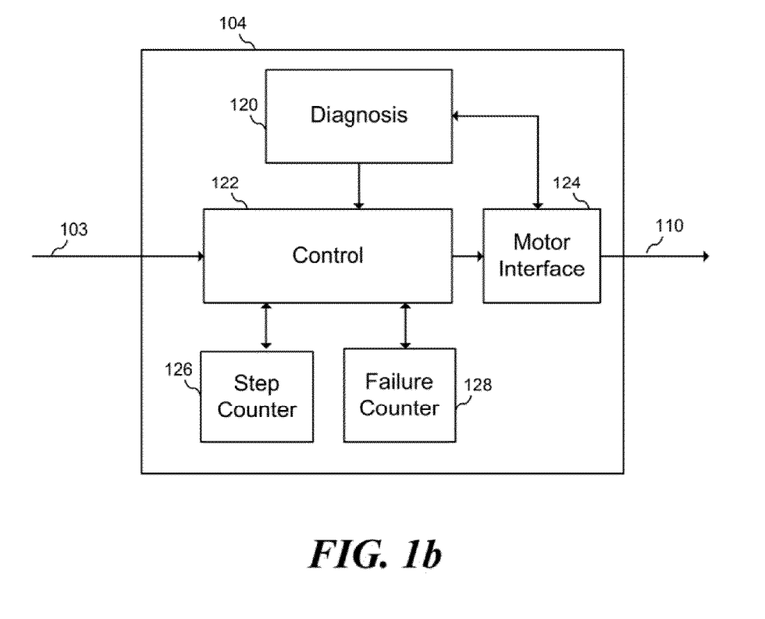

FIG. 1b illustrates a detailed view of step motor driver 104, which includes control block 122, motor interface 124, diagnosis block 120, step counter 126, and failure counter 128. Control block receives step count commands over interface 103. In an embodiment, interface 103 is a two-wire interface in which the first signal indicates a step pulse and the second signal indicates a polarity or direction. Alternatively, other interfaces may be used, such as a serial or parallel interface issuing a command work. During normal operation, control block 122 increments or decrements step counter 126 depending on the polarity of the step command and commands the motor interface 124 to rotate the step motor a step in the direction indicated by the polarity of the step command. Motor interface 124 includes, for example two full bridges for the two stepper motors, and may be implemented using techniques known in the art.

In an embodiment, diagnosis block 120 monitors motor interface 124, as well as other parameters such as power supply voltage and sensor status. In the case of a failure, diagnosis block determines the cause of the failure. In some embodiments, diagnosis block 120 operates according to principles outlined in U.S. patent application Ser. No. 13/248, 586, entitled "Diagnosis of Over-Current Conditions in Bipolar Motor Controllers," filed on Sep. 29, 2011, which application is hereby incorporated by reference in its entirety. Microcontroller 102 uses the failure cause to determine whether a recoverable failure has occurred. Examples of recoverable failures include voltage spikes or temporary loss of power to motor interface 124. For example, power supply disturbances during the cranking phase of starting an engine may temporarily shut off power the stepper motor. If an error is detected by the diagnosis block, failure counter 128 increases with each incoming step pulse, while step counter 126 continues to increase or decrease depending on the direction and/or polarity of the step pulse. Once the failure condition has ended, the contents of step counter 126 may be adjusted based on the accumulated value in the failure counter. In one embodiment, the value of the failure counter is subtracted from the step counter. Normal operation then resumes, and the system operates as though the step motor's position is reflected by the value in the step counter. In some cases, the adjusted step counter value may not exactly reflect the actual step motor position after the temporary failure. However, in many cases, the error between the actual and reflected position is small enough in order to continue operating the system safely.

Examples of non-recoverable failures include, but are not limited to, a damaged step motor, an open coil, a shorted coil, an over-current condition due to a short circuit of the supply rails, an over voltage shutdown condition, an undervoltage shutdown condition, and a lost sensor supply due to an underload or overload condition. In one embodiment, the sensor is a tilt sensor that senses the angle of the vehicle. This sensed angle is used by the system to determine an angle to which the headlamp chassis is controlled. In some embodiments, a sensor failure is considered a non-recoverable failure because a failure prevents the availability of a parameter that is important to the operation of the system. When a non-recoverable failure is sensed, the motor driver is disabled until it is restarted by microcontroller 102.

Figure 2A:
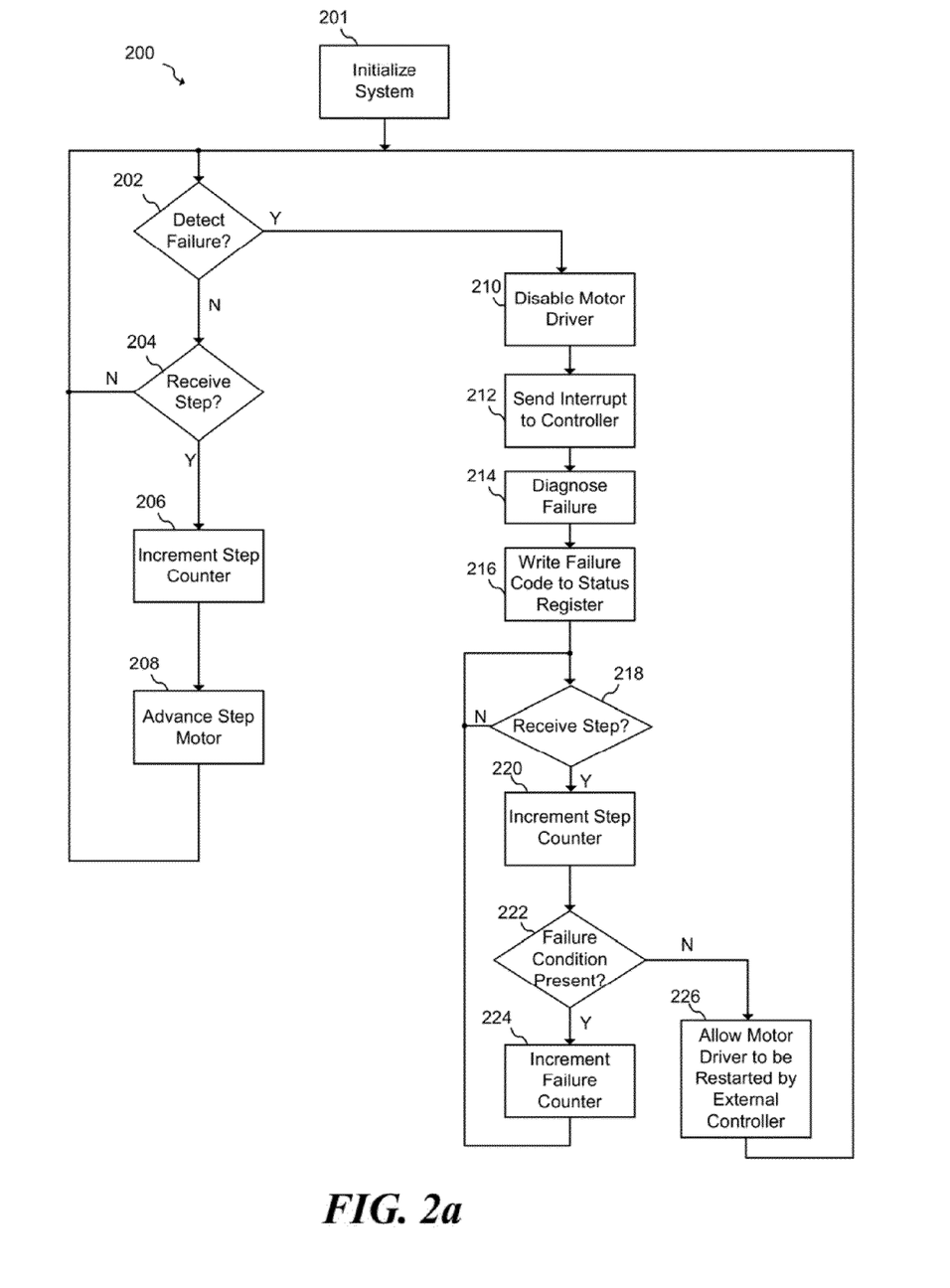
FIG. 2 illustrates a flowchart of an embodiment method.

FIG. 2a illustrates flowchart 200 showing an embodiment method for step motor driver 104 (FIGS. 1a-b). In step 201, the system is initialized. Initialization may include rotating the step motor to an initial position and setting a defined relationship between a step clock and a rotor angle, and resetting the step counter and the failure counter. In some embodiments, the failure counter and the step counter are initialized with initial values. In one embodiment, the step counter is initialized with a value indicating an initial position and the failure counter is initialized with zero. In step 202, a determination is made as to whether a failure condition exists.

In the absence of a failure condition, if a step control command is received from the controller (step 204), the step counter is incremented (step 206) and the motor is advanced according to the polarity of the step command (step 208). If, on the other hand, a failure is detected in step 202, the motor driver is disabled (step 210), and an interrupt is sent to the controller (step 212). In step 214, the cause of the failure is diagnosed, and a failure code corresponding to the cause of the failure is written into a status register in step 216.

If a step is received in step 218, step counter 220 is incremented or decremented depending on the polarity of the step. If a failure condition is still present (step 222), the failure counter (step 224) is also incremented or decremented depending on the polarity of the step. If, on the other hand, the failure condition is not present (step 220), the motor driver is allowed to be restarted by an external controller (step 226), and operations may proceed as normal starting again at step 202. In one embodiment, the failure condition is removed by the microprocessor resetting a failure flag. Alternatively, the motor driver may be enabled after receipt of a reset signal, or other signal recognized by the step motor driver to resume advancing the motor on receipt of step pulses.

Figure 2B:
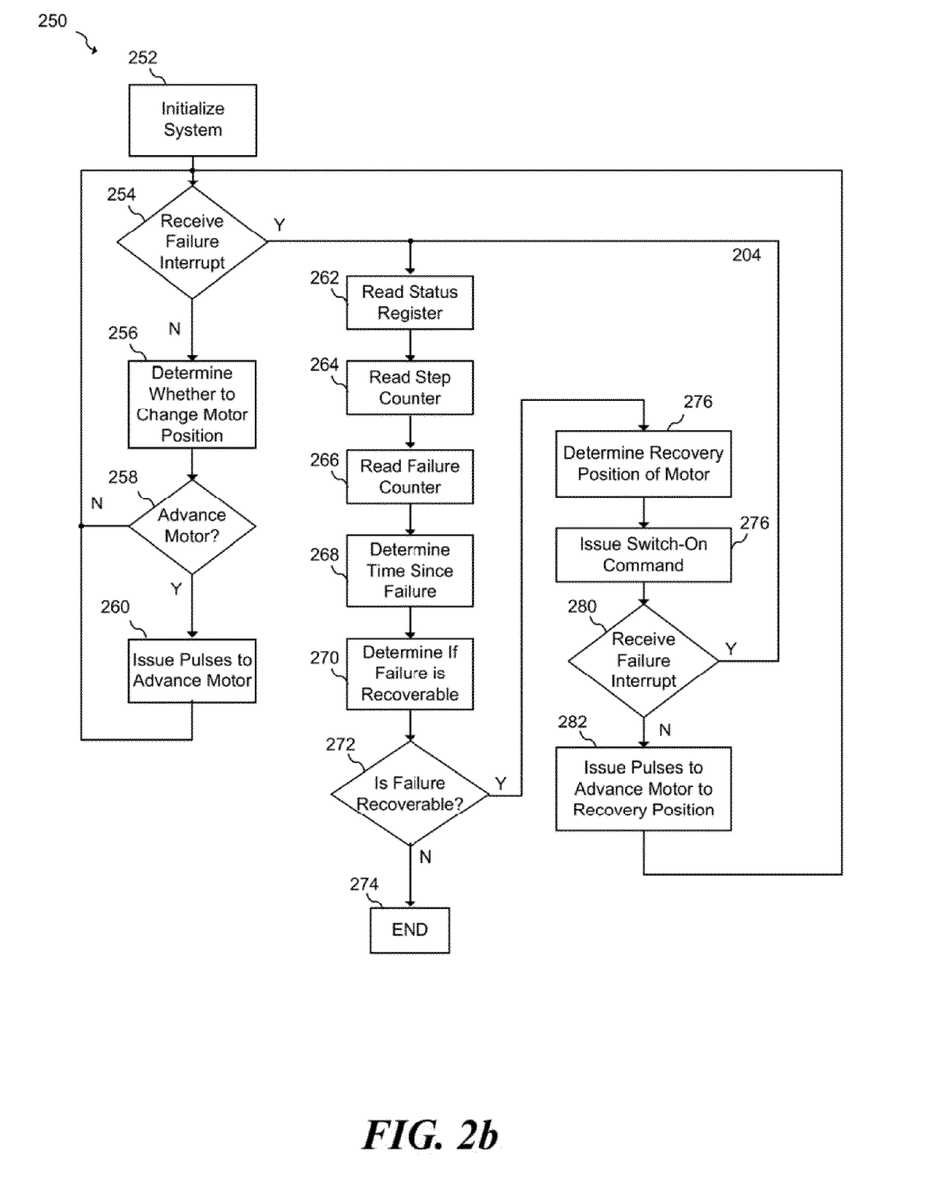

FIG. 2b illustrates flowchart 250 showing an embodiment method of controlling step driver 104 (FIGS. 1a-b) using a controller, such as microcontroller 102 (FIG. 1a). In step 252, the controller is initialized. In step 252, the controller determines whether an interrupt was received from the step motor driver. If no interrupt is received, the controller issues step commands to the step motor driver according to a normal mode of operation. For example, in step 256, the controller determines whether to change the position of the motor. This determination may be made according to sensor information coming from accelerometers, automotive control systems, tilt sensors and the like. In one embodiment, the controller seeks to maintain the position of the step motor such that an automotive headlamp coupled to the step motor is positioned in a safe position. If it is determined that the motor requires a change in position, (step 258), the controller issued pulses to the step motor driver in order to advance the position of the motor. In one embodiment, these pulses may comprise a pulse and a polarity, such that the motor is advanced in a first direction according to a first polarity, or advanced in a second or opposite direction according to a second polarity.

If the controller receives a failure interrupt (step 254), the controller determines the cause of the failure and attempts to resume operation of the motor if it is determined that the failure was a recoverable failure. The controller reads the status register (step 262), step counter (step 264) and the failure counter (step 266) of the step motor controller. In some embodiments, the controller also determines the elapsed time since the failure (step 268). In some embodiments, the elapsed time since the failure is a boundary condition used to minimize angle failure due to continued rotor rotation after the motor driver is disabled.

In step 270, the controller determines whether the failure is a recoverable failure. In an embodiment, the controller analyzes the failure code contained in the status register that was read in step 262. For example, if the status register indicates that the failure was caused by a temporary overvoltage condition, the failure may be recoverable since there is a possibility that the step motor system is still operational. If on the other hand, the status register indicates that the failure is due to a shorted or open coil, then the failure is not recoverable. In an embodiment, if the failure is determined not be a recoverable failure, then the process ends (step 274) at least until the system is reinitialized.

In some embodiments, the controller uses the elapsed time since the failure to help determine whether a recoverable failure has occurred. In some embodiments, the rotor of the step motor may continue to rotate due to inertia when field current is removed from the motor, as is done by the step motor when a failure is detected. If the failure is detected and processed within a short amount of time, for example, in less than a second, the motor position may be close to the motor position prior to the failure. In such a case, the present position of the motor may be estimated by subtracting the failure counter from the step counter to determine the pre-failure position of the motor. The smaller the elapsed time since the failure, the better the estimate. If, on the other hand, a large amount of time has elapsed, then the motor may have had an opportunity to rotate a significant amount such that an estimate based on the step counter and failure counter is inaccurate. In an embodiment, the controller compares the elapsed time to a threshold to determine if the failure is recoverable if the status register contents indicate the presence of a potentially recoverable failure. The actual time thresholds are embodiment and implementation specific, and depend on the type and loading of the step motor.

If the controller determines that the failure is recoverable (step 272), the controller next determines the present position of the motor and determines a recovery position of the motor (276). In an embodiment, this position may be determined, for example, by subtracting the contents of the failure counter from the step counter. The value of the step counter represents the number of pulses, or the integrated pulses that occurred after step motor controller detected the failure. Based on the determined position the controller determines a recover position, as well as a number of step pulses that need to be issued in order to advance the motor to the determined recovery position. The controller then issues a switch-on command (step 276) to the step motor driver that signals the step motor controller to resume a normal mode of operation. In some embodiments, this may be a reset command or other command. If a further failure interrupt is not received (step 280), the controller transmits step pulses to the step motor driver in order to position the step motor in the recovery position. Operation then proceeds as normal at step 254. If a further failure interrupt is received, the operation proceeds back at step 262.

Figure 3:
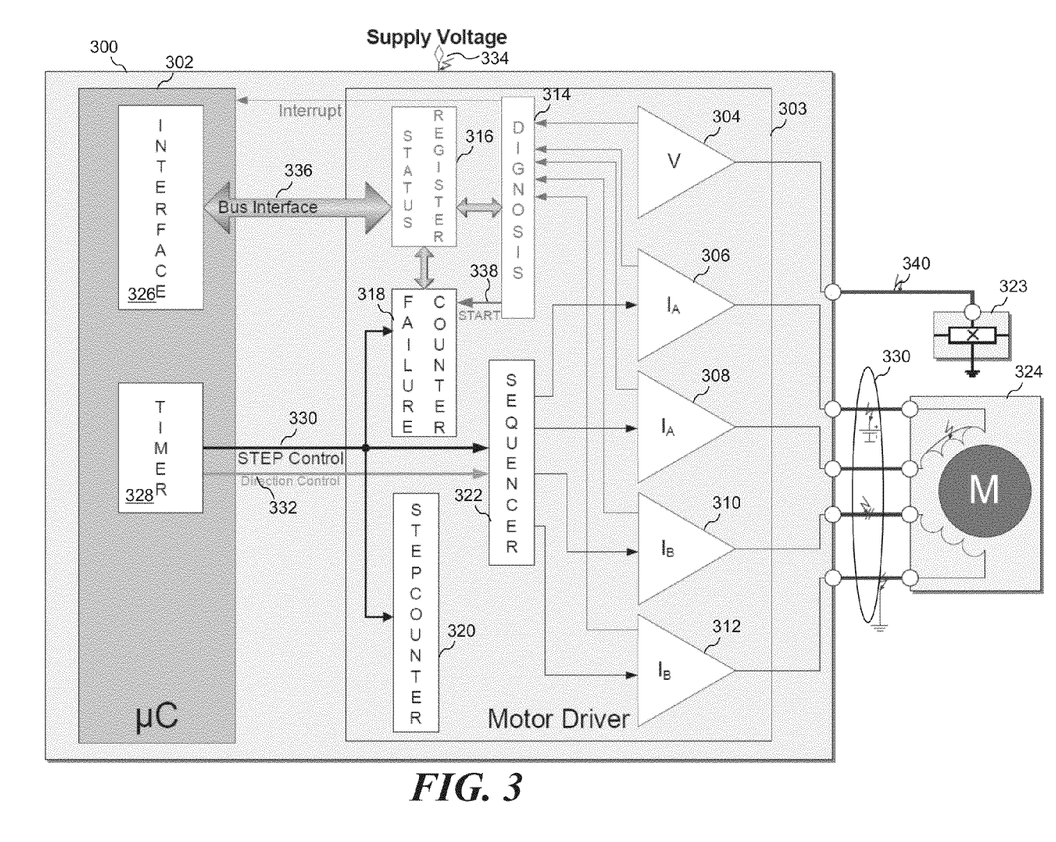
FIG. 3 illustrates a headlamp control system according to another embodiment of the present invention.

FIG. 3 illustrates motor control system 300 according to a further embodiment. Motor control system 300 interfaces to step motor 324 via motor control interface 330 and provides power to sensor 323 via sensor power interface 340. In an embodiment, sensor 323 is a tilt sensor and motor 324 is a bipolar step motor. In alternative embodiments, sensor 323 can also be a hall sensor or a middle position switch. In further embodiments, more than one sensor and/or type of sensor may be used in a system. For example, more than one tilt sensor may be used to movement on multiple axes.

Motor control system 300 has microcontroller 302 and motor driver 303. In an embodiment, microcontroller 302 and motor driver 303 are each implemented as a separate integrated circuit. Alternatively, microcontroller 302 and motor driver 303 may reside on a same integrated circuit. In further embodiments, the system may be partitioned differently. In some embodiments, microcontroller 302 and motor driver 303 are present in a module.

In an embodiment, motor driver 303 has step counter 320 and failure counter 318 which operate according to embodiment principles described above. Sequencer 322 controls step motor driving blocks 306, 308, 310 and 312 according to techniques known in the art based on STEP Control signal 330 and Direction Control signal 332. In one embodiment, sequencer 322 causes driving blocks 306, 308, 310 and 312 to move one step for each pulse received on STEP Control signal 330. In an embodiment, sequencer causes the step motor to advance in a first direction if Direction Control signal 332 is in a first state and advanced in a second, or opposite, direction if Direction Control signal 322 is in a second state.

In an embodiment, diagnosis block 314 monitors sensor power supply block 304, step motor driving blocks 306, 308, 310 and 312, and the system supply voltage 334 to determine whether there is a fault condition with system 300. In some embodiments, diagnosis block 314 also monitors other parameters such as an overcurrent, an open coil, or a shorted coil condition. Microcontroller 302 further determines whether the fault condition is a recoverable or non-recoverable fault condition. For example, diagnosis block 314 may detect an open or short coil within motor 324 via motor driving blocks 306, 308, 310 and 312, or detect a broken sensor or a shorted power supply and provides that status information to microcontroller 302 to determine that these fault conditions are non-recoverable. On the other hand, diagnosis block 314 may detect a voltage spike on the power supply of system 300 and determine that the fault condition is recoverable.

In an embodiment, on detection of a fault condition, diagnosis block 314 writes a description of the fault condition in status register 316 and sends an interrupt to microcontroller 302. In one embodiment, writing the status register includes setting one or more bits that correspond to the particular status condition. For example, one bit may correspond to an overcurrent condition in driver 306, while another bit may correspond to an open coil coupled to driver 308. In the case of a fault condition that causes a shutdown of motor driver, diagnosis block activates failure counter 318 via start signal 338 such that failure counter 318 starts accumulating step pulses from STEP Control signal 330 during the time that sequencer is not advancing motor 324. In some embodiments, step counter 320 continues to be incremented during the failure condition. In some embodiments, the value of failure counter 318 is subtracted from step counter 320. This may be performed by microcontroller 302, since there is no defined time to start the subtraction.

Interface 326 of microcontroller 302 communicates with motor driver 303 via bus interface 336. In an embodiment, the contents of status register 316, failure counter 318 and step counter is retrievable via bus interface 336. Timer block 328 issues step commands via STEP control signal 330 and Direction Control signal 332. In one embodiment, timer block 328 issues a pulse to advance motor 324 one step. In some embodiments, during operation, possible deviations caused by run time effects of microcontroller 302 may be synchronized periodically by reading out the step-counter value and comparing the value with an internal step counter within microcontroller 302. In some embodiments, the determination of whether a detected failure is recoverable or non-recoverable is made by micro-controller 302 based on information from status register 316.

In an embodiment, a method of controlling a step motor system includes operating the step motor system in a normal mode. In the normal mode, the step motor is advanced upon receipt of a step pulse. If a failure event is detected, the step motor is operated in a failure mode. In the failure mode, a failure counter is incremented upon receipt of the step pulse, and the step motor is not advanced.

The method may further include advancing the motor according to a value of the failure counter if the failure event is a recoverable failure event. In an embodiment, the step pulse may include a positive step pulse or a negative step pulse. Incrementing the step counter in the normal mode may include incrementing the step counter in a positive direction upon a receiving the positive step pulse, and incrementing the step counter in a negative direction upon a receiving the negative step pulse, where the negative direction is opposite the positive direction. Furthermore, advancing the step motor in the normal mode may include advancing the step motor in a first direction upon receipt of the positive step pulse, and advancing the step motor in a second direction upon receipt of the negative step pulse, where the second direction is opposite the first direction. In some embodiments, advancing the motor according to a value of the failure counter includes positioning an automotive headlamp to an estimated last position.

In an embodiment, detecting the failure event includes determining whether a recoverable failure event occurred, and determining whether a non-recoverable failure event occurred. A recoverable failure event may include at least one of a voltage spike or a temporary power interruption has occurred, and a non-recoverable failure event may include at least one of the step motor having an open coil, the step motor having a shorted coil, an over voltage condition, an under voltage condition, and an overload condition. In some embodiments, the method may include subtracting a value of the failure counter from the step counter if the failure event is a recoverable failure event.

In accordance with a further embodiment, a method of operating a step motor driver includes detecting a failure condition and determining a cause of the failure condition. If a failure condition is detected, the step motor driver is disabled, and a signal is sent to the controller indicating that a failure has occurred. The step motor driver also signals the controller the cause of the failure condition. In some embodiments, controller is signaled via an interrupt, and the cause of the failure is signaled by writing a status register and transmitting contents of the status register to the controller. If a step pulse is received after a failure is detected, a step counter and a failure counter are incremented. The values of the step counter and the failure counter may also be transmitted to the controller. If a failure condition is not detected, the step motor is advanced and the step counter is incremented upon receipt of the step pulse.

In accordance with another embodiment, a method of operating a step motor driver includes detecting a failure indication signal from the step motor driver. If the failure indication signal is not detected, step pulses are transmitted to the step motor driver. If the failure indication signal is detected, a failure cause, a step counter value and a failure counter value is received from the step motor driver. The step counter value represents a number of step pulses received by the step motor driver, and the failure counter value represents a number of step pulses received by the step motor driver after the failure is detected. The method also includes determining whether a recoverable failure has occurred based on the failure cause. If the failure is recoverable, a number of correction step pulses is determined based on a difference between the step counter value and the failure counter value, and the correction step pulses are transmitted to the step motor driver.

In an embodiment, detecting the failure indication signal includes receiving an interrupt, receiving the failure cause includes reading a status register of the step motor driver via a digital interface, receiving the step counter value includes reading the step counter value from the step motor driver via the digital interface, and receiving the failure counter value includes reading the failure counter value from the step motor driver via the digital interface.

In an embodiment, determining whether the failure is recoverable includes determining an elapsed time from the detection of the failure indication signal. The failure is determined to be recoverable if the elapsed time is less than a threshold and/or the failure cause is one of a plurality of predetermined recoverable failure categories.

In an embodiment, a method of operating a motorized headlamp system having a step motor coupled to a headlamp includes operating the system in a normal mode. The normal mode includes advancing the step motor and incrementing a step counter upon receipt of a step pulse. The method also includes detecting a failure event and diagnosing the failure event to determine whether the failure event is a recoverable failure event or a non-recoverable failure event. After a failure event is detected, the failure counter is advanced upon receipt of the step pulse without advancing the step motor. If the failure event is a recoverable failure event, the motorized headlamp is repositioned to an estimated position based on a value of the failure counter.

In an embodiment, determining whether the failure is a non-recoverable failure event includes at least one of determining whether there is an open or shorted coil in the step motor, determining whether there is an open current condition in the step motor or in a step motor driver, determining whether there is an over voltage condition in the step motor or in the step motor driver, or determining whether the headlamp is non-functioning.

In an embodiment, a step motor controller includes an input port configured to receive motor step commands, and a step motor driver coupled to the input port, where the step motor driver is configured to be coupled to a step motor. The controller also includes a step counter coupled to the input port and a failure counter coupled to the input port. The step counter is configured to accumulate motor step commands when operating in a normal mode and the failure counter configured to accumulate motor step commands during a failure mode. In an embodiment, the step motor driver is configured to increment the step motor upon receipt of the step motor commands when operating in the normal mode and the step motor driver is configured not to increment the step motor upon the receipt of the step motor commands when operating in the failure mode.

In some embodiments, the step motor controller includes a diagnosis block coupled to the step motor driver, where the diagnosis block is configured to detect a failure cause of the step motor. The diagnosis block may be further configured to determine whether a recoverable or a non-recoverable failure event has occurred. In an embodiment, a recoverable failure event includes at least one of a voltage spike or a temporary power interruption has occurred, and a non-recoverable failure event includes at least one of the step motor having an open coil, the step motor having a shorted coil, an over voltage condition, an under voltage condition, and an overload condition.

In some embodiments, the step motor is implemented on an integrated circuit. In further embodiments, the step motor controller may be configured to control a step motor coupled to an automotive headlamp. In an embodiment, the step motor controller is configured to position the step motor to an estimated position according to a value of the failure counter if a recoverable failure occurs. The controller may further include a digital controller coupled to the input port, where the controller is configured to transmit the motor step commands to the step motor driver. In an embodiment, the digital controller may include a microcontroller. In some embodiments, the controller may also include the step motor.

In accordance with a further embodiment, a system for controlling a position of an automotive headlamp includes a step motor driver. The step motor driver includes an input port configured to receive motor step commands, a step motor interface circuit coupled to the input port, the step motor driver configured to be coupled to a step motor, a diagnosis block coupled to the step motor interface circuit configured to detect a failure of the step motor, a step counter and a failure counter coupled to the input port. The step counter is configured to accumulate motor step commands when operating in a normal mode, the failure counter configured to accumulate motor step commands during a failure mode. In some embodiments, the step counter is further configured to accumulate motor step commands when operating in the failure mode.

In an embodiment, the step motor driver is configured to increment the step motor upon receipt of the step motor commands when operating in the normal mode and the step motor driver is configured not to increment the step motor upon the receipt of the step motor commands when operating in the failure mode.

In an embodiment, the system also includes a controller coupled to the input port, where the controller configured to transmit the motor step commands to the step motor driver.

Advantages of embodiments include the availability of selective failure signals for root cause analysis and/or the option to synchronize the internal step counter to the estimated last rotor position by subtracting the failure counter from the step counter. In such embodiments, possible uncertainty about the estimated and the real rotor position of the step motor can be reduced to the unmonitored step loss due to inertia. The decision to restart the system, or disable the system may be performed by a control unit based on a summary of a detected or diagnosed root cause of failure.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of controlling a step motor system, the method comprising:
    operating the step motor system in a normal mode, operating the step motor in a normal mode comprising advancing the step motor and incrementing a step counter upon receipt of a step pulse;
    detecting a failure event; and
    upon detecting the failure event, operating the step motor system in a failure mode, operating the step motor in a failure mode comprising incrementing a failure counter upon receipt of the step pulse without advancing the step motor.

2. The method of claim 1, further comprising advancing the motor according to a value of the failure counter if the failure event is a recoverable failure event.

3. The method of claim 1, wherein:
    the step pulse comprises a positive step pulse or a negative step pulse;
    incrementing the step counter in the normal mode comprises incrementing the step counter in a positive direction upon a receiving the positive step pulse, and incrementing the step counter in a negative direction upon a receiving the negative step pulse, the negative direction opposite the positive direction; and
    advancing the step motor in the normal mode comprises advancing the step motor in a first direction upon receipt of the positive step pulse, and advancing the step motor in a second direction upon receipt of the negative step pulse, the second direction opposite the first direction.

4. The method of claim 1, wherein advancing the motor according to a value of the failure counter comprises positioning an automotive headlamp to an estimated last position.

5. The method of claim 1, wherein detecting the failure event comprises:
    determining whether a recoverable failure event occurred; and
    determining whether a non-recoverable failure event occurred.

6. The method of claim 5, wherein:
    a recoverable failure event comprises at least one of a voltage spike or a temporary power interruption has occurred; and
    a non-recoverable failure event comprises at least one of the step motor having an open coil, the step motor having a shorted coil, an over voltage condition, an under voltage condition, and an overload condition.

7. The method of claim 1, further comprising subtracting a value of the failure counter from the step counter if the failure event is a recoverable failure event.

8. A method of operating a step motor driver, the method comprising:
    detecting a failure condition;
    determining a cause of the failure condition;
    if a failure condition is detected
        disabling the step motor driver,
        signaling a controller that a failure has occurred,
        signaling the cause of the failure condition to the controller,
        incrementing a step counter if a step pulse is received,
        incrementing a failure counter if the step pulse is received; and
    if a failure condition is not detected, advancing the step motor and incrementing the step counter upon receipt of the step pulse.

9. The method of claim 8, wherein signaling the controller that the failure has occurred comprises sending an interrupt to the controller.

10. The method of claim 8, wherein signal the cause of the failure condition comprises writing a status register, and transmitting contents of the status register to the controller.

11. The method of claim 8, further comprising transmitting values of the step counter and the failure counter to the controller.

12. A method of operating a step motor driver, the method comprising:
    detecting a failure indication signal from the step motor driver;
    if the failure indication signal is not detected, transmitting step pulses to the step motor driver; and
    if the failure indication signal is detected,
        receiving a failure cause from the step motor driver,
        receiving a step counter value from the step motor driver, the step counter value representing a number of step pulses received by the step motor driver, receiving a failure counter value, the failure counter value representing a number of step pulses received by the step motor driver after failure detection, determining whether a recoverable failure has occurred based on the failure cause, if the failure is recoverable, determining a number of correction step pulses based on a difference between the step counter value and the failure counter value, and transmitting the correction step pulses to the step motor driver.

13. The method of claim 12, wherein:

detecting the failure indication signal comprises receiving an interrupt;

receiving the failure cause comprises reading a status register of the step motor driver via a digital interface;

receiving the step counter value comprises reading the step counter value from the step motor driver via the digital interface; and receiving the failure counter value comprises reading the failure counter value from the step motor driver via the digital interface.

14. The method of claim 12, wherein determining whether the failure is recoverable comprises determining an elapsed time from the detection of the failure indication signal, wherein the failure is determined to be recoverable if the elapsed time is less than a threshold and the failure cause is one of a plurality of predetermined recoverable failure categories.

15. The method of claim 12, wherein the failure is determined to be recoverable if the failure cause is one of a plurality of predetermined recoverable failure categories.

16. A method of operating a motorized headlamp system comprising a step motor coupled to a headlamp, the method comprising:

operating the system in a normal mode, operating the system in the normal mode comprising advancing the step motor and incrementing a step counter upon receipt of a step pulse;

detecting a failure event;

diagnosing the failure event to determine whether the failure event is a recoverable failure event or a non-recoverable failure event;

incrementing a failure counter upon receipt of the step pulse without advancing the step motor after detecting the failure event; and if the failure event is a recoverable failure event, repositioning the headlamp to an estimated position based on a value of the failure counter.

17. The method of claim 16, wherein determining whether the failure is a non-recoverable failure event comprises at least one of:

determining whether there is an open or shorted coil in the step motor;

determining whether there is an open current condition in the step motor or in a step motor driver;

determining whether there is an over voltage condition in the step motor or in the step motor driver; or determining whether the headlamp is non-functioning.

18. A step motor controller comprising:

an input port configured to receive motor step commands;

a step motor driver coupled to the input port, the step motor driver configured to be coupled to a step motor;

a step counter coupled to the input port, the step counter configured to accumulate motor step commands when operating in a normal mode; and a failure counter coupled to the input port, the failure counter configured to accumulate motor step commands during a failure mode, wherein the step motor driver is configured to increment the step motor upon receipt of the step motor commands when operating in the normal mode, and the step motor driver is configured not to increment the step motor upon the receipt of the step motor commands when operating in the failure mode.

19. The step motor controller of claim 18, further comprising a diagnosis block coupled to the step motor driver configured to detect a failure cause of the step motor.

20. The step motor controller of claim 18, wherein the step motor is implemented on an integrated circuit.

21. The step motor controller of claim 18, wherein the step motor controller is configured to control a step motor coupled to an automotive headlamp.

22. The step motor controller of claim 18, further comprising the step motor.

23. The step motor controller of claim 18, wherein the step motor controller is configured to position the step motor to an estimated position according to a value of the failure counter if a recoverable failure occurs.

24. The step motor controller of claim 18 further comprising a digital controller coupled to the input port, the controller configured to transmit the motor step commands to the step motor driver.

25. The step motor controller of claim 24, wherein the digital controller comprises a microcontroller.

26. The step motor controller of claim 24, further comprising a diagnosis block coupled to the step motor driver configured to detect a failure cause of the step motor, wherein the digital controller is further configured to determine whether a recoverable or a non-recoverable failure event has occurred based on output from the diagnosis block.

27. The step motor controller of claim 26, wherein:

a recoverable failure event comprises at least one of a voltage spike or a temporary power interruption has occurred; and a non-recoverable failure event comprises at least one of the step motor having an open coil, the step motor having a shorted coil, an over voltage condition, an under voltage condition, and an overload condition.

28. A system for controlling a position of an automotive headlamp, the system comprising:

a step motor driver comprising:

an input port configured to receive motor step commands, a step motor interface circuit coupled to the input port, the step motor driver configured to be coupled to a step motor, a diagnosis block coupled to the step motor interface circuit detecting a failure of the step motor;

a step counter coupled to the input port, the step counter configured to accumulate motor step commands when operating in a normal mode; and a failure counter coupled to the input port, the failure counter configured to accumulate motor step commands during a failure mode, wherein the step motor driver is configured to increment the step motor upon receipt of the step motor commands when operating in the normal mode, and the step motor driver is configured not to increment the step motor upon the receipt of the step motor commands when operating in the failure mode.

29. The system of claim 28 further comprising a controller coupled to the input port, the controller configured to transmit the motor step commands to the step motor driver.

* * * * *